Dec. 19, 1967 W. SMEULERS 3,359,505

RELAXATION OSCILLATOR HAVING COMBINED DIRECT AND INDIRECT SYNCHRONIZATION

Filed March 24, 1966 2 Sheets-Sheet 1

INVENTOR
WOUTER SMEULERS
BY Frank R. [signature]
AGENT

INVENTOR
*WOUTER SMEULERS*

BY
AGENT 3,359,505

RELAXATION OSCILLATOR HAVING COMBINED DIRECT AND INDIRECT SYNCHRONIZATION

Wouter Smeulers, Emmasingel, Eindhoven, Netherlands, assignor to North American Phillips Company, Inc., New York, N.Y., a corporation of Delaware Filed Mar. 24, 1966, Ser. No. 537,077
Claims priority, application Netherlands, Apr. 3, 1965, 65—4,263
9 Claims. (Cl. 331—10)

ABSTRACT OF THE DISCLOSURE

A relaxation oscillator is provided with means for direct synchronization by means of synchronizing pulses, and indirect synchronization by means of the output of a phase discriminator. The synchronizing pulses have an amplitude sufficient to draw charging current through an amplifier element to a time constant circuit, so that the frequency increasing effect due to the pulses is compensated by a frequency decreasing effect of an additional charge on the time constant circuit.

The invention relates to a circuit arrangement for synchronizing a relaxation oscillator, comprising at least one amplifying element included in a regenerative circuit; and a phase discriminator of the coincidence type for readjusting the oscillator frequency. Integrated synchronizing pulses required for direct synchronization are applied by way of a capacitor to the control-electrode of the amplifying element.

Such a circuit arrangement may be employed for the vertical synchronization in television receivers and is described in U.S. Patent No. 3,070,753. In this case, however, special steps are taken to attenuate the raster synchronizing pulses supplied for direct synchronization in an in-synchronization state.

This attenuation is carried out for two reasons:

(1) In order to ensure that, when a few synchronizing pulses are lacking in the in-synchronization state, the natural frequency will not vary excessively, since this might give rise to jumping of the picture in a vertical sense and (2) In order to attenuate any penetrating interference pulses, so that the latter cannot adversely affect the synchronization.

Recent technology has provided such a perfection in avoiding interferences that any interference pulses will no longer have a harmful effect. Therefore, the above-mentioned second reason is, for the major part, no longer of any importance. In the interference suppressing technique the separated interference pulses are added with such polarity to the video signal or the synchronizing pulses separated therefrom that the interference pulses are removed from the desired signal. This may sometimes involve the risk of simultaneous disappearance of the synchronizing pulses. The lack of a few raster synchronizing pulses used for direct synchronization results in an immediate change-over of the picture, if no special precautions are taken.

In the known arrangement the raster synchronizing pulses are attenuated in the in-synchronization state for the first-mentioned reason. By means of the phase discriminator for controlling the natural frequency of the vertical relaxation oscillator, the oscillator frequency is shifted as far as possible toward the frequency of the synchronizing signal via the indirect synchronization. The direct synchronizing pulses are integrated in order to obtain the phase difference required for the phase discriminator in accordance with the frequency difference between oscillator and synchronization frequency. If the pulses required for direct synchronization are not attenuated, a comparatively smaller phase difference will be produced in the known arrangement in which the raster synchronizing pulses are applied to the vertical relaxation oscillator with cut-off polarity than in the case of attenuated synchronizing pulses. (In the case of unattenuated synchronizing pulses the direct synchronization is so to say more effective, whereas the indirect synchronization need be less effective.) This becomes manifest in a greater difference between oscillator and synchronization frequency due to the sole indirect synchronization. If, in the case of non-attenuation, a few pulses are lacking, the said greater frequency difference produces a relatively greater jump of the picture.

The attenuation for the second reason is, indeed, no longer required, but since the improved interference suppressing technique has increased the risk of the omission of a few synchronizing pulses the first-mentioned reason has become more important. U.S. Patent No. 3,070,753 indicates that a correct attenuation requires a complicated circuit arrangement. Since the second reason has become out of the question, it might be preferred to omit the attenuation completely, if the lack of a few synchronizing pulses does not produce a large jump of the picture.

In order to solve this problem, according to the invention, the synchronizing pulses have a polarity rendering the amplifying element conducting. In a synchronized state, the oscillator frequency is approached closely to the frequency of the synchronizing pulses by means of the voltage supplied by the phase discriminator. The pulses have such a high amplitude and such contents that at their appearance such an amount of current flows towards the control-electrode that the frequency-increasing effect of the direct synchronization is substantially obviated by the greater charge accumulated in the capacitor due to the current to the control-electrode.

It should be noted that particularly for the vertical synchronization the combination of direct and indirect synchronizations is desired. The direct synchronization is required, because indirect synchronization alone is practically not possible due to the high time constant of the smoothing network connected after the phase discriminator for smoothing the control-voltage originating from the phase discriminator. It is necessary to choose a high time constant for this smoothing network in order to ensure that the indirect synchronization has a satisfactory fly-wheel effect. Due to this high time constant it would take a long time, when the arrangement gets out of synchronization, before the in-synchronization state is restored. However, if the direct synchronization is maintained, this synchronization is capable of restoring the in-synchronization state much more rapidly.

However, if only the direct synchronization were employed, the picture would jump very strongly when a few synchronizing pulses fail to appear, the jump increasing as the frequency difference between the oscillator and the synchronizing signal increases. When direct and indirect synchronization are used it is ensured that this frequency difference is always minimized.

A few possible embodiments of a circuit arrangement according to the invention will now be described with reference to the accompanying drawing, in which FIG. 1 shows a first embodiment in which the relaxation oscillator is a blocking oscillator, and the amplifying element is a triode.

Figure 3:
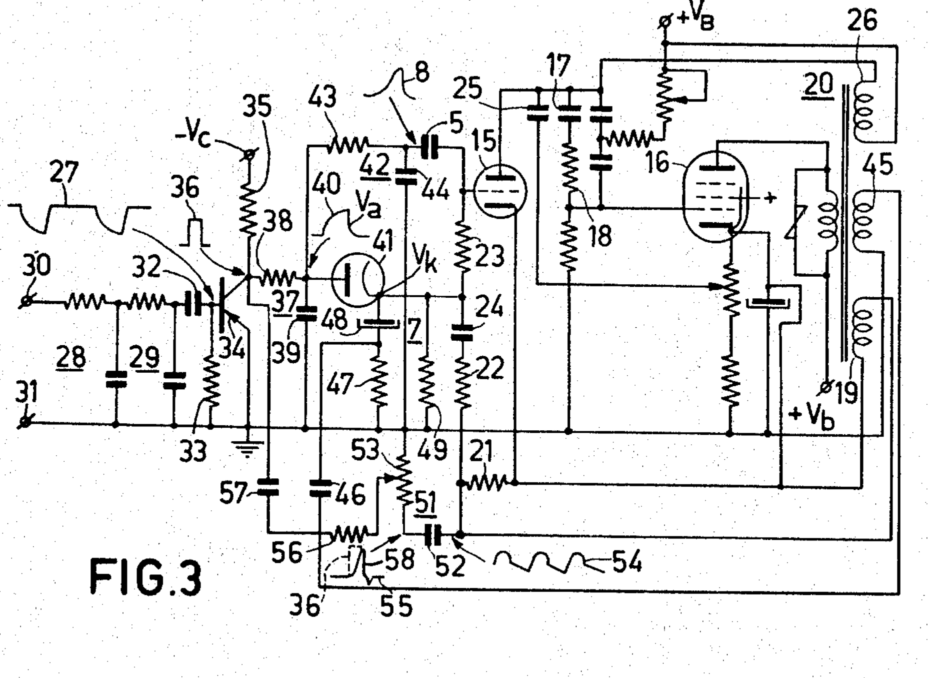
FIG. 3 shows a detailed circuit arrangement suitable for use in the vertical deflection stage of a television receiver.
Figure 4:
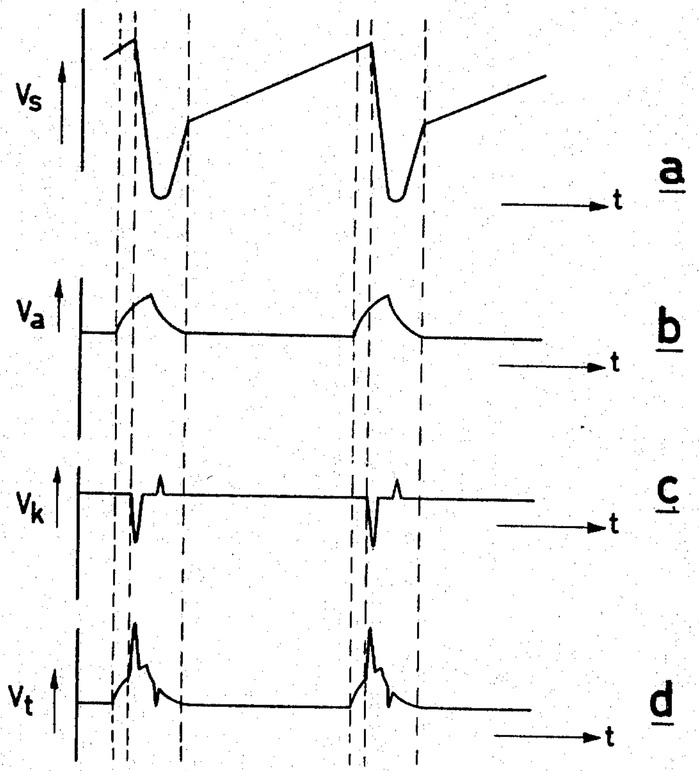

FIG. 4 serves to explain the operation of the phase discriminator used in the arrangement of FIG. 3 and FIG. 5 shows again a relaxation oscillator formed by a blocking oscillator, in which the amplifying element is a transistor.

Figure 1:
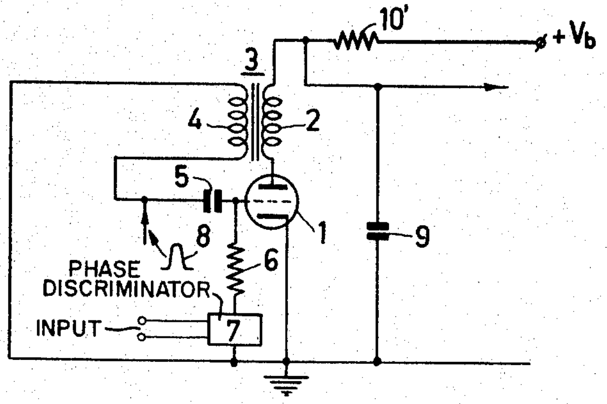

FIG. 1 shows a relaxation oscillator formed by a blocking oscillator, which comprises a triode 1, the anode circuit of which includes the primary winding 2 of a transformer 3, the secondary winding 4 of which is included in the grid circuit of the triode 1. One end of the secondary winding 4 is connected to earth and the other end is connected through a capacitor 5 to the control-grid of the triode 1. This grid is, moreover, connected through a leakage resistor 6 and a control-member 7 to earth. The control-member 7 serves for the readjustment of the frequency of the relaxation oscillator. The block 7 may be a phase discriminator in which the synchronizing pulses are compared with a comparison signal derived from the oscillator. The output voltage of the phase discriminator is then capable, as is known, of readjusting the frequency of the relaxation oscillator. To the capacitor 5 are furthermore applied pulses 8 for direct synchronization. As is described in U.S. Patent No. 3,070,753 the pulses 8 have to be integrated. The anode circuit of the tube 1 includes furthermore a charging capacitor 9, which is connected through a resistor 10′ to the positive supply voltage $+V_b$. The capacitor 9 is charged through the resistor 10′ and discharged through the triode 1 and the primary winding 2 as soon as the triode 1 conveys current. During this time a positive-going pulse will be induced from the primary winding 2 in the secondary winding 4, which pulse reaches by way of the control-grid of the tube 1 the capacitor 5. As a result grid current will flow to the control-grid so that the capacitor 5 is charged. Consequently, the electrode of the capacitor 5 connected to the control-grid of the tube 1 will obtain a negative charge and the tube will be cut off. When the tube 1 is non conducting, the capacitor 5 can discharge through the winding 4, earth, the block 7 and the resistor 6, the discharge time being determined by the RC-time of the network formed by the capacitor 5 and the resistor 6. When the voltage of the control-grid of the tube 1 exceeds the cut off voltage $V_{af}$ of the tube 1, the tube 1 will again convey current and the whole cycle is repeated. Therefore, the voltage $V_g$ of the control-grid of the tube 1 assumes the waveform illustrated in FIG. 2.

Figure 2:
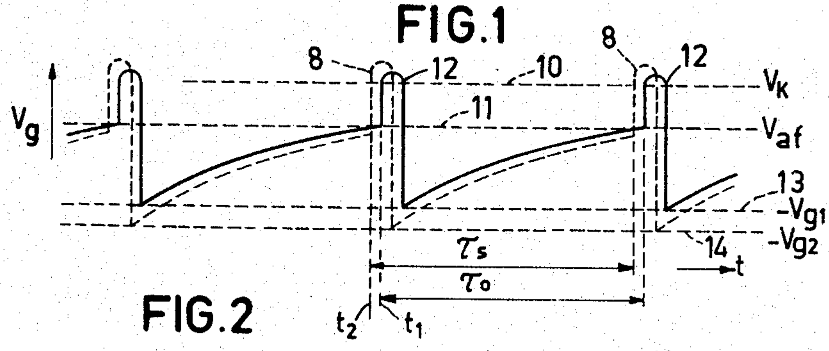
FIG. 2 is a curve illustrating the grid voltage operative on the control-grid of the triode of FIG. 1.

According to the invention the synchronizing pulses 8 are applied with such a high amplitude to the control-grid of the tube 1 that the amplitude is higher than is required for filling the grid space of the tube 1. The grid space of a tube is to be understod to mean the value of the voltage required for completely cutting off the tube. This is illustrated in FIG. 2, in which the line 10 indicates the cathode potential $V_k$ and the line 11 the cut-off voltage $V_{af}$ of the tube 1. If therefore the control-grid of the tube 1 is at the voltage $V_{af}$, the anode current of the tube 1 is cut-off. The grid space is therefore the potential $V_k - V_{af}$. The synchronizing pulses must therefore have at least an amplitude exceeding the difference $V_k - V_{af}$.

When by means of the phase discriminator 7 the natural frequency of the relaxation oscillator is adjusted to an extent such that the oscillator frequency is substantially equal to the synchronization frequency, the phase difference between the synchronizing pulses 8 and the fly-back pulses 12 will only be small in the in-synchronization state. This state is illustrated in FIG. 2. Due to the high amplitude of the synchronizing pulses 8, these pulses will exceed the cathode potential $V_k$, which means that the control-grid is rendered temporarily positive by the synchronizing pulses with respect to the cathode voltage $V_k$. Then a higher grid current will flow than in the case in which the fly-back pulses 12 alone are operative. A higher grid current means, however, a greater charge of the capacitor 5.

Comparing the situation with and without synchronizing pulses 8, the following conclusion may be drawn. Without synchronizing pulses 8 the grid voltage $V_g$ attains the cut-off voltage $V_{af}$ at the instant $t_1$. This means that the anode current starts at the instant $t_1$ and thus the fly-back time of the vertical relaxation oscillator is initiated. The positive-going fly-back pulse 12, which reaches the control-grid of the tube 1 through the winding 4, produces a definite grid current, so that the electrode of the capacitor 5 connected to the control-grid assumes a negative voltage $-V_{g1}$, indicated by the line 13 in FIG. 2. Then the capacitor 5 is discharged until the grid voltage attains the cut-off voltage $V_{af}$, after which the next-following fly-back starts. The grid voltage therefore has a waveform as is indicated by the curve in full lines in FIG. 2, when the raster synchronizing pulses 8 are lacking. In this manner the period $\tau_0$ of the oscillator signal is fixed and hence the natural frequency of the relaxation oscillator.

Considering now the synchronizing pulses 8, applied with a deblocking polarity, the situation changes as follows. As stated above, the frequency difference and hence the phase difference between the oscillator and the synchronizing signal is readjusted by means of the phase discriminator 7 to an extent such that only a small phase difference between the synchronizing pulses 8 and the fly-back pulses 12 remains. It is known that the leading edge of the synchronizing pulses 8 must lie in front of that of the fly-back pulses 12, since otherwise direct synchronization is not possible. This means that the synchronizing pulses 8 must provide that the anode current starts earlier, i.e. not at the instant $t_1$, but at the instant $t_2$. As a result the synchronizing pulses have a frequency-increasing effect, since the fly-back is initiated sooner.

However, by the choice of said high amplitude of the raster synchronizing pulses 8 the additional grid current obtained will raise the charge of the capacitor 5 to an extent such that the voltage at the control-grid of the tube 1, after the termination of the fly-back time, does not attain a negative value $-V_{g1}$ but attains a higher negative value $-V_{g2}$, which is indicated by the line 14 in FIG. 2. The charge of the capacitor 5 to a higher negative value has so to say a frequency-decreasing effect on the oscillator signal. Therefore, it may be said that the frequency-increasing effect of the synchronizing pulses 8, which becomes manifest in an earlier start of the fly-back, is neutralised by the frequency-decreasing effect of the higher charge of the capacitor 5. The grid voltage $V_g$ of the tube 1 has therefore the waveform illustrated by the broken curve of FIG. 2 in the presence of the synchronizing pulses 8. This new grid signal has a periodicity $\tau_s$ and if it is ensured that $\tau_s = \tau_0$ or that $\tau_s$ is substantially equal to $\tau_0$, the frequency of the oscillator signal with and without synchronizing pulses 8 will be practically the same. If therefore a few raster synchronizing pulses fail to appear both the frequency-increasing effect and the frequency-decreasing effect fail to occur, so that the oscillator frequency remains the same or substantially the same. Since, in addition, the waveform of the synchronizing pulses 8 and the phase discriminator 7 ensure that the phase difference between the pulses 8 and 12 is always very slight, the jump of the phase will hardly be appreciated at the lack of a few raster synchronizing pulses 8, while the frequency does not vary substantially if at all.

Also the "catching principle" is fully maintained, since in the case of an out-of-synchronization state the control-voltage supplied by the phase discriminator 7 will fail to appear. Since this control-voltage has a frequency-increasing effect, its absence will involve a decrease in frequency. However, the direct synchronization can become effective when the pulses 8, which are superimposed as before on the voltage $V_g$, can initiate the anode current and this is the case as soon as they exceed the cut-off voltage $V_{af}$, even to a minor extent. When the in-synchronization state is reached, grid current will therefore not be produced, so that we are concerned with a direct synchronization which raises the frequency. The in-synchronization state is restored practically immediately after the voltage of the discriminator 7 fails to appear. Then the discriminator voltage may be built up again, so that the state illustrated in FIG. 2 is regained.

A second embodiment of a circuit arrangement according to the invention is shown in FIG. 3. The relaxation oscillator is of the so-called self-oscillating type, which means that the vertical output tube forms part of the oscillator. Such a self-oscillating circuit consists of two tubes, i.e., a triode 15 and a pentode 16, operating simultaneously as a vertical output tube. The anode of the tube 15 is connected through a capacitor 17 and a resistor 18 to the control-grid of the tube 16, whereas the anode circuit of the tube 16 is connected through a secondary winding 19 of the vertical output transformer 20 to the control-grid of the triode 15. The last-mentioned connection is established through the resistors 21, 22 and 23 and the capacitor 24.

Further parts of the relaxation oscillator are the charging capacitor 25, which is charged by the supply voltage $+V_b$ through a so-called beat winding 26 and discharged through the triode 15, which must therefore be conducting during the vertical fly-back time.

For synchronizing this relaxation oscillator the integrated raster synchronizing pulses 8 are applied via the capacitor 5 to the contril-grid of the triode 15 and the phase discriminator 7 is connected through the resistor 23 to said control-grid.

The raster synchronizing pulses 8 are derived from the supplied raster synchronizing signal 27. The signal 27 is obtained by double integration by means of the integration networks 28 and 29 from the overall synchronizing signal containing line and raster synchronizing pulses applied to the terminals 30 and 31. The signal 27 is applied through a capacitor 32 and a resistor 33 to the base electrode of a p-n-p transistor 34, which operates as a pre-amplifier for the raster synchronizing pulses. The amplifier 34 operates at the same time as a so-called pulse clipper, so that a pulse 36 is produced at its collector resistor 35, which pulse has maximum steepness of the flanks and is so to say cut from the raster synchronizing signal 27. The pulses 36 are reintegrated by means of an integration network 37 consisting of a resistor 38 and a capacitor 39, so that integrated pulses 40 are obtained. These pulses $V_a \rightarrow$40 are applied to the anode of a diode 41, which forms part of the phase discriminator 7. The pulses 40 are reintegrated with the aid of an integration network 42, consisting of a resistor 43 and a capacitor 44, so that the synchronizing pulses 8 required for direct synchronization are obtained. The pulses 36 are twice integrated for mitigating the steepness of the leading edges of the pulses, since it is thus ensured that even with a small phase difference between the synchronizing pulses 8 and the fly-back pulses 12, as is indicated in FIG. 2, the frequency-increasing effect of the raster synchronizing pulses 8 is initially small, so that in fact the phase discriminator 7 permits adjustment of a small phase difference between the synchronizing signal and the oscillator signal. Clipping and subsequent integration have the advantage that it is possible to fix very accurately both the amplitude and the flank steepness of the integrated pulses. This is important for the satisfactory operation of the direct synchronization and for that of the phase discriminator 7.

The phase discriminator 7 of FIG. 3 operates as follows. A further secondary winding 45 of the vertical output transformer 20 has a voltage $V_s$ as illustrated in FIG. 4*a*. The voltage $V_s$ is differentiated with the aid of a differentiating network consisting of a capacitor 46 and a resistor 47, so that a voltage $V_k$ of the kind shown in FIG. 4*c* is obtained. This voltage is applied through the large capacitor 48 to the cathode of the diode 41. The capacitor 48, together with the resistor 49, serves simultaneously as a smoothing network of high time constant for the output voltage of the phase discriminaor 7.

The anode of the diode 41 receives the once integrated raster synchronizing signal 40, indicated by $V_a$ and illustrated again in FIG. 4*b*. FIG. 4*d* illustrates the sum signal $V_t$, which is operative at the diode 41. From FIG. 4*d* it will be apparent that the polarity of the signal $V_k$ is inverted because the effect of negative going pulses at the cathode of the diode 41 is that of an increase in current.

It will be obvious that invariably the negative-going pulse of the signal $V_k$ appearing during a fly-back, together with the signal $V_a$ determines the current passing through the diode 41 and hence also the output voltage which is applied through the resistor 23 to the control-grid of the triode 15. In dependence upon the phase difference between this negative-going pulse and the signal $V_a$ the output voltage will have a higher or lower positive value, so that the frequency of the oscillator signal will be increased to a greater or lesser extent.

In the out-of-synchronization state there is no coincidence between the signals $V_k$ and $V_a$ and the positive voltage completely fails to appear so that after the discharge of the capacitor 48 the relaxation oscillator oscillates in its natural, uncontrolled frequency, which is chosen so that it is always lower than the minimum frequency of the synchronizing pulses 8. Therefore the synchronizing pulses 8 are always capable of restoring the in-synchronization state by the direct synchronization.

FIG. 3 furthermore shows a method for reducing the area of the synchronizing pulses 36. As is shown in FIG. 2, the pulses 8 used for direct synchronization determine the extent of additional grid current of the tube 15 in the in-synchronization state. As the area of the pulses 8 decreases, the extent of additional grid current will decrease, so that also the frequency-decreasing effect is reduced. The area cannot be reduced by reducing the amplitudes of the pulses 8 for the following reason.

If the amplitudes are reduced the catching range is reduced since in this case the frequency difference between the synchronizing signal and the oscillator signal, at which the peaks of the pulses 8 just exceed the cut-off voltage $V_{af}$ (see FIG. 2), is also reduced.

The area is therefore reduced by substracting a pulse so that the area is reduced but the amplitude is not reduced.

This is illustrated in FIG. 3. By means of a differentiating network 51, consisting of a capacitor 52 and a resistor 53, the voltage 54, derived from the winding 19, is differentiated. The voltage 54 has the same waveform as the voltage $V_s$ of FIG. 4*a*, obtained from the winding 45, but it has the opposite phase. After differentiation in the network 51 a signal 55 is obtained, which has the same waveform as the signal $V_k$ of FIG. 4*c*, the phase being, of course, also opposite. The signal 55 is applied through a separation resistor 56 and a separation capacitor 57 to the collector of the clipping transistor 34. The positive-going pulse 58 of the signal 55 has the effect of reducing the negative supply voltage $-V_c$ (applied to the resistor 35). It will be obvious that by supplying the pulse 58 the area of the pulse 36 is reduced by those of the pulse 58 (the situation is illustrated for an in-synchronization state at signal 55 by broken lines for the position of the pulse 36 with respect to the pulse 58 indicated by full lines). The amplitude of the pulse 36 (and certainly not the part of the amplitude of 36 occurring in front of the leading edge of the pulse 58) is not affected thereby.

In this manner the purpose aimed at, i.e. the reduction of the area of the pulse 36 and hence of the pulse 8 without reduction of the amplitude is achieved.

The amplitude and hence the area of the pulse 58 may be adjusted by means of the variable tapping on the resistor 53.

Since at least the area of the pulses 8 determine the frequency-decreasing effect, this effect can be adjusted with the aid of said variable tapping. This provides the possibility of adjusting, with a given frequency-increasing effect of the synchronizing pulses 8, the frequency-decreasing effect by the additional grid current so that the aforesaid condition $T_s = \tau_0$ can be substantially fulfilled completely.

Although it is stated above that the positive-going pulses 38 are applied to the collector electrode of the transistor 34, it will be obvious that the same result may be obtained by applying for example the signal $V_k$ of FIG. 4*c* to the emitter electrode of said transistor.

Figure 5:
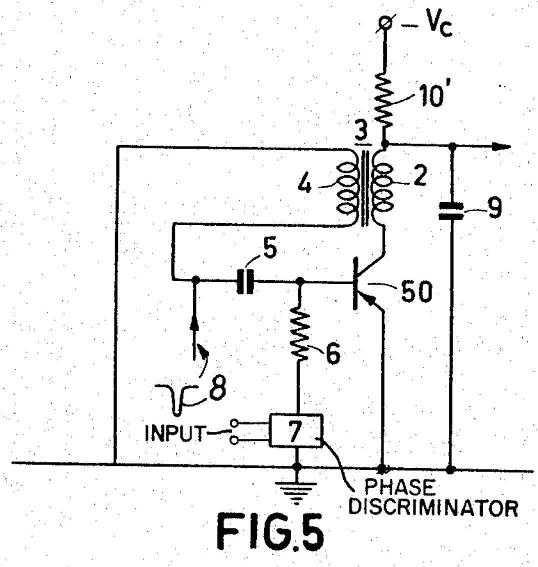

FIG. 5 shows finally an embodiment of a blocking oscillator according to the invention in which the amplifying element is formed by a transistor 50. The further parts of the arrangement of FIG. 5 have the same reference numerals as in FIG. 1 and their functions are identical. Since use is made of a p-n-p transistor 50, a negative supply voltage $-V_c$ must be applied to the collector resistor and the raster synchronizing pulses 8 must be applied with a polarity unlike that of FIG. 1. Also in the case of FIG. 5 these raster synchronizing pulses must produce a base current in the base-emitter circuit of the transistor 50. This base current has to raise, like in the arrangement of FIG. 1, in the in-synchronization state, the charge of the capacitor 5. The polarity of the control-voltage supplied by the phase discriminator 7 must also be adapted.

What is claimed is:

1. A synchronized relaxation oscillator circuit comprising a source of synchronizing pulses, an amplifier device having a control electrode and an output electrode, an input circuit connected to said control electrode, means for regeneratively coupling said output electrode to said input circuit whereby said oscillator has a natural frequency lower than the frequency of said synchronizing pulses, means for deriving output pulses from said oscillator circuit, phase discriminator means, means applying said synchronizing pulses and output pulses to said phase discriminator means to produce a control voltage, means applying said control voltage to said input circuit whereby the oscillating frequency of said oscillator circuit is increased to substantially the frequency of said synchronizing pulses, and means applying said synchronizing pulses to said input circuit, said input circuit comprising capacitor means, means applying said synchronizing pulses to said control electrode by way of said capacitor means with a substantially constant amplitude independent of the synchronization state of said oscillator circuit, said synchronization pulses having a polarity and amplitude to cause current flow through said device to charge said capacitor, and resistor means connected to discharge said capacitor thereby producing a frequency decreasing bias on said control electrode, said synchronizing pulses having an amplitude whereby the frequency decreasing effect due to charge on said capacitor means resulting from said synchronizing pulses substantially neutralizes the frequency increasing effect of application of said synchronizing pulses to said control electrode.

2. A synchronized relaxation oscillator circuit comprising a source of synchronizing pulses, an amplifier device having an input electrode, an output electrode and a common electrode, input circuit means connected between said input and common electrodes, output circuit means connected between said output and common electrodes, means regeneratively coupling said input and output circuits whereby said oscillator circuit oscillates at a natural frequency lower than the frequency of said synchronizing pulses, means deriving output pulses from said output circuit, coincidence type phase discriminator means, means applying said synchronizing pulses and said output pulses to said phase discriminator means to produce a control voltage, means applying said control voltage to said input circuit, said input circuit comprising resistor means and means for applying said control voltage between said input and common electrodes by way of said resistor means, whereby the frequency of oscillation of said oscillator circuit is increased to substantially the frequency of said synchronizing pulses, means applying said synchronizing pulses to said input circuit, said input circuit further comprising capacitor means, and means for applying said synchronizing pulses to said input electrode by way of said capacitor means with a substantially constant amplitude independent of the synchronization state of said oscillator circuit, said synchronization pulses having an amplitude and polarity to cause common-electrode-input-electrode current flow in said device to produce a charge on said capacitor means, said capacitor means being connected to said resistor means whereby said capacitor means is discharged by way of said resistor means to produce a bias on said device tending to decrease the oscillation frequency of said oscillator circuit, said synchronizing pulses having an amplitude whereby said decrease in oscillation frequency resulting from said charging to said capacitor due to the application of said synchronizing pulses to said input electrode substantially neutralizes the frequency increasing effect caused by application of said synchronizing pulses to said input electrode.

3. The oscillator circuit of claim 2, in which said means applying said synchronizing pulses to said input circuit comprises clipping means for converting said synchronizing pulses to square wave pulses, means for integrating said square wave pulses twice, and means for applying said twice integrated pulses to said input circuit.

4. The oscillator circuit of claim 3, in which said means applying said synchronizing pulses to said input circuit comprises means for differentiating said output pulses, means for subtracting said differentiated pulses from said square wave pulses to reduce the area while maintaining the amplitude of the synchronizing pulses, and integrating means for applying the output of said subtracting means to said input circuit.

5. The oscillator circuit of claim 2, in which said means applying said synchronizing pulses to said input circuit comprises clipping amplifier means for producing square wave pulses from said synchronizing pulses, and integrating means for applying the output of said clipping amplifier means to said input circuit, and said means applying synchronizing pulses to said phase discriminator means comprises means applying the output of said clipping amplifier means to said phase discriminator means.

6. The oscillator circuit of claim 5, in which said integrating means comprises means for twice integrating the output of said clipping amplifier means.

7. The oscillator circuit of claim 5, in which said phase discriminator means comprises a diode, integrating means for applying the output of said clipping amplifier means to one electrode of said diode, means applying differentiated output pulses to an electrode of said diode, whereby the pulses applied to said diode are added, and means for deriving said control voltage from said other electrode.

8. The oscillator circuit of claim 5, in which said differentiated pulses are applied to said other electrode with a polarity opposite to the polarity of pulses applied to said one electrode.

9. The oscillator circuit of claim 5, comprising means for providing differentiated output pulses of adjustable polarity, and means for subtracting said differentiated output pulses from the output of said clipping amplifier means whereby the area of output pulses of said clipping amplifier means can be adjusted without varying their amplitude.

References Cited

UNITED STATES PATENTS 3,070,753 12/1962 Smeulers ---------- 331—10 X

ROY LAKE, *Primary Examiner.*

S. H. GRIMM, *Assistant Examiner.*